: 2,783,222

WELL DRILLING COMPOSITION AND METHOD OF MANUFACTURE THEREOF

Henry W. Rahn, Corpus Christi, Tex., assignor to Columbia-Southern Chemical Corporation, Allegheny County, Pa., a corporation of Delaware No Drawing. Application May 12, 1953, Serial No. 354,629

11 Claims. (Cl. 260—124)

This invention relates to a novel composition and method of preparing the same. It is known that tannic acid and humic acid are valuable for many purposes. As a typical illustration, certain tannic acid extracts have been used for the purpose of adjusting the viscosity of oil well drilling muds and also in the tanning of leather.

Tannic acid useful for this purpose is obtained from various woods and also from certain barks, shells, and other fibrous materials containing tannin. Humic acid useful for this purpose is obtained from various carboniferous mineral compositions containing degraded vegetable material, such as lignite, lignite shale, and the like. In many cases, the bark, lignite shale or the like is used directly without attempt to extract the tannic acid component therefrom. In other cases, the active tannic acid or humic acid is extracted from these materials and the extract is used.

According to the present invention, a novel method has been provided for recovering and using tannin and humic acid components and for improving the characteristics of the compositions thus obtained. In accordance with this invention, a tannin or humic acid, or water insolubles which naturally occur with tannin or humic acid, or a mixture containing two or more of the foregoing, is heated with an alkali metal hydroxide whereby to improve the solubility and other characteristics of the composition treated. Following the treatment with alkali metal hydroxide, the resulting product is treated with tannic or humic acid to reduce the alkalinity thereof.

This process may be applied to treatment of various naturally occurring materials which contain tannins or humic acid as well as various products which contain lignins. It also may be used to treat extracts of tannin and/or humic acid. It may be applied with especially good results accruing to the treatment of naturally occurring materials containing 10 percent by weight or more of tannin or humic acid and to the water insoluble residues of such materials, for example, after extraction of the humic acid or tannic acid content therefrom with hot or cold water or cold alkali metal hydroxide solution.

Thus, tree bark, seed hulls, and like materials not only contain tannins which may be extracted with water, but also contain other materials which do not dissolve in water and are but poorly soluble or even insoluble in aqueous alkali metal hydroxide. As a consequence, when these materials are extracted with water to recover tannic acid, the resulting aqueous extraction leaves a sludge which, unless removed, is difficult to handle. These sludge materials have little or no significant utility. Lignite and the like also have a substantial proportion of components which do not readily disperse in water or in cold dilute aqueous alkali metal hydroxide. These compounds also are inert and have been of little utility.

By following the present invention, the reaction with the alkali metal hydroxide materially increases the dispersibility and solubility of these hitherto undissolved solids. The addition of the tannic or humic acid to this resulting composition reduces the alkalinity to any desired level comparable to that of sodium tannate or tannic acid and the resulting product not only has a reduced alkali content but consists essentially of a mixture of tannic and/or humic or like components without adverse contamination with other materials.

The materials thus obtained are salts of the lignin components or degraded lignin components which may or may not contain substantial tannic and/or humic acid and/or salts thereof. They are good dispersing agents. They may be used effectively in the adjustment of the viscosity of oil well drilling muds. They also may be used in the tanning of leather, in cements such as Portland cement in order to increase the strength thereof, and in various other fields where tannin compositions are useful.

In performance of an important embodiment of the process, an aqueous alkali metal hydroxide solution, such as sodium hydroxide solution, is used. A naturally occurring composition containing the tannin or humic acid and other naturally occurring water insolubles, i. e., tree bark, lignite shale or the like, is dispersed in this solution.

If desired, the tannin or humic acid containing material may be previously extracted with water or cold alkali metal hydroxide solution in order to remove the water soluble components (tannins) therefrom, either partially or completely. For example, tree bark such as mangrove bark, wattle bark, and the like, may be extracted with water in order to remove the tannic acid. In like manner, lignite shale may be extracted with aqueous caustic soda in the cold or with water in order to remove soluble materials. The resulting residue, which may or may not contain tannin or humic acid, may then be subjected to the heating with alkali metal hydroxide and acidification herein contemplated.

The amount of alkali metal hydroxide used should be in excess of that required to react with water soluble acidic material (tannic acid and the like). That is, sufficient alkali metal hydroxide should be present to react with the compounds of low water solubility. Hence, the pH of the alkali metal hydroxide-tannic mixture or the alkali-humic mixture subjected to reaction should be above 7. Usually, sufficient alkali is used to raise the pH of the slurry at least to about 10 to 12 before heating or digestion.

The exact amount of alkali metal hydroxide which is required depends upon the amount of readily soluble acid components present in the material undergoing treatment. These components consume alkali as they are extracted. In general, the amount of such hydroxide used ranges from about 4 parts of alkali metal hydroxide by weight per part of a material such as bark or lignite shale (or other carboniferous mineral) etc., to about one part of alkali metal hydroxide to about 10 parts by weight of such material (bark and the like).

Solutions of any convenient concentration of sodium hydroxide or like alkali metal hydroxide may be used, although extremely dilute solutions have the objection of containing an excessive amount of water which must be removed from the mixture whereas solutions containing excessively high amounts of sodium hydroxide are viscous and difficult to handle. Normally, these solutions should contain about 5 to about 70 percent by weight of NaOH or its equivalent.

The slurry thus formed is subjected to heat. This heating effectively serves to convert certain components which are insoluble in cold alkali metal hydroxide to a more soluble or at least more dispersible state. The time of heating which is required in order to effect this result depends to a considerable degree upon the temperature of heat. For example, when the heating is effected at temperatures of 75 to 100° C., it is necessary to heat over relatively long periods, for example, 1 or more hours.

On the other hand, shorter periods are permissible when the temperature of heating is above 100° C. Much longer periods of digestion are required at lower temperatures.

When the slurry is evaporated at above 100° C., the desired digestion occurs as an incident thereto and is completed by the time a solid product is obtained. Thus, the mixture may be spray dried or may be dried on a drum or tray drier. This results in the production of a pulverulent, granular solid which may contain more or less water (5 percent or more).

In accordance with a further embodiment, it is also possible to effect the required heating or digestion without removing a large amount of water, at least while limiting the amount of water removed so that a slurry remains. This may be done by long heating at a temperature below the boiling point of the solution, or by heating under pressure and/or by replacing evaporated water during heating.

In any case, the heating is continued until a substantial portion of the insoluble components are solubilized or at least rendered more dispersible in the mixture. That is, the resulting product, when dispersed in water, does not settle to any appreciable degree and actually as much as 60 to 90 percent thereof goes into colloidal or true solution.

Following the heat treatment, the product obtained normally has a relatively high pH. Since caustic soda is consumed as a consequence of the heating, the amount, if any, which is present depends upon the amount initially present. Where the caustic soda initially was in sufficient excess over the tannic acid content of the product, the final product contains free caustic, and the pH of an aqueous slurry or solution of the resulting product normally is in excess of about 10. On the other hand, when smaller amounts of caustic are used, the resulting product largely is a mixture of alkali metal salts containing little free caustic and having a pH ranging from 9 to 10.

For many purposes, a product of reduced alkalinity is required. For example, in the oil fields when these products are used as oil well drilling mud additives, it frequently is advantageous to have available a product having a pH in the range of 9 to 10. In other fields it is even advantageous to have an acidic material. Accordingly, the resulting product is treated with a suitable acidic tannic or humic component in order to reduce the pH below about 10, usually from 7 to 10, although a lower pH may be achieved if desired. The product, after digestion or heating with alkali metal hydroxide, is treated with a product containing tannic acid or humic acid. In such a case, the resulting product is a mixture of tannic or humic acid components and/or their salts and/or the salts of the solubilized components. The tannic or humic acid used may be a previously prepared acidic extract or may be a naturally occurring acidic composition such as lignite, tree bark or the like. Preferably, these materials should contain in excess of about 5 to 10 percent by weight of the tannic or humic acid. Humic acid may be determined by extraction with 5 percent sodium hydroxide at room temperature. Tannic acid may be determined by extraction with hot water.

The alkalinity reduction may be effectively accomplished by adding the acidic component to an aqueous slurry of the alkali metal hydroxide treated product. For example, if the alkali metal hydroxide treated product has not been dried to a solid state, the acidic component may be added directly to the slurry after the heating treatment. On the other hand, if a dried product has been produced by the heat treatment, this dried product may be slurried in water and the acid component added. Following this, the resulting product is dried in accordance with standard procedures. If desired, it may be further baked in order to improve the solubility characteristics thereof.

According to a further embodiment, excess alkali metal hydroxide is heated with a tannin or humic acid composition of the type herein discussed until a dry product has been obtained. This may be ground up with a solid composition containing free humic or tannic acid, such as a dried extract produced by water extraction of a tannin or humic acid containing material. In such a case, the dry product when dissolved in water will react to reduce the alkalinity thereof.

The above described process may be applied to the treatment of many types of materials. Thus, tree barks, including the barks of mangrove, mimosa (wattle), redwood, sumac, celery pine, divi divi, archil, cutch, quercitron, pistacio, oak, osage orange, logwood, myrobalan, spruce, chestnut, tarnwood, and the like, may be heated with alkali metal hydroxide and then treated with free tannic or humic acid. Other materials which may be so treated include various woods such as quebracho chips, sapwood, chestnut wood, buttonwood, ironwood, peat, and the like degraded woody materials, as well as various woody materials which contain a high content of lignin and/or hemicellulose.

Tannic and humic acid extracts, such as the extracts of quebracho or chestnut wood or wattle or mangrove bark, also may be heated with caustic soda and the product treated with further tannic and/or humic acid in accordance with the methods described above and also in the ensuing examples. When extracts are treated, however, less advantage accrues since the hemicelluloses, lignites, and other components in the natural bark, wood or like material are not activated.

Black liquor produced from the soda process of making pulp may be treated with tannic acid or humic acid also.

Various pulverulent adsorbent materials, such as calcium carbonate, silica, calcium silicate, wood fibers, magnesium silicate, magnesium carbonate, barium carbonate, bentonite, kaolin, magnesium oxide, etc. may be added to the composition. These materials serve to adsorb any water which might otherwise be picked up by the composition and to retain it in a pulverulent state.

The following examples are illustrative:

*Example I*

Six hundred pounds of a commercial lignite shale and 800 pounds of an aqueous solution containing 50 percent by weight of NaOH are mixed together. The product is heated to a temperature of 90 to 100° C., diluted with water to produce a solution having a specific gravity of 50 to 70° Twaddell, and is delivered to a drum drier which was heated by 100-pound per square inch steam to a temperature of approximately 170° C. while the drum is rotated at about 2 R. P. M. The resulting product is hammer-milled to produce a coarse granular product capable of passing a 10-mesh screen. This product contains approximately 10 percent of water, based upon the total weight of the composition. The amount of available alkali present, computed by titration to methyl orange endpoint, is about 35 percent by weight expressed as NaOH.

This product is dissolved in water and enough quebracho extract is added to reduce the pH of the slurry to approximately 9.7. Thereafter, the resulting product is evaporated to dryness in a tray or drum drier.

*Example II*

The process according to Example I is performed except that prior to addition of the quebracho, the solid product obtained from the drum drier is heated at 240 to 260° C. for 2.1 hours and the dry product is mixed with anhydrous pulverulent quebracho extract.

*Example III*

Three hundred grams of lignite shale and 400 grams of aqueous sodium hydroxide solution containing 50 percent by weight of NaOH are mixed together and heated in an oven at 180° C. for 16 hours. The available alkali content of this material, as determined by titration to the methyl orange endpoint, was about 46 percent by weight, computed as NaOH. The resulting product is redissolved in water and enough quebracho extract is added to the solution to reduce the pH of the solution to approximately 9.7. Thereafter, the product is heated to dryness in a drum or tray drier.

*Example IV*

Four hundred fifty pounds of hammer-milled mangrove bark containing 32 percent by weight of tannin was mixed with 28.5 gallons of aqueous caustic soda solution containing 45.1 percent by weight of NaOH, 77 pounds of sodium carbonate, and 42 pounds of calcium hydroxide added as an aqueous slurry containing 275 grams of calcium oxide per liter. After digestion of this mixture overnight at 90 to 95° C., 90 pounds of lignite shale (Carbonox, supplied to the trade by National Lead Corporation) was added and the product mixed for 2 hours at 90° C. Thereafter, the mixture was dried on a drum drier which was heated by steam at a pressure of 120 pounds per square inch, the rate of rotation of the drum being 5 R. P. M. The resulting product had a pH of approximately 11.25. When a product of comparable character was produced without addition of the lignite shale, the product had a pH of 12.25 when dissolved in water.

*Example V*

Mangrove bark containing approximately 32 percent of tannic acid was mixed with water in the proportion of 100 grams of mangrove bark to 275 grams of water. This mixture was brought to a boil and kept boiling for 1 hour. Thereupon, the resulting mixture was strained through a 48-mesh screen and the residue upon the screen was rinsed with 125 milliliters of water. This wash water was combined with a water extract or filtrate.

The remaining residue was mixed with 50 grams of aqueous caustic soda solution containing 50 percent by weight of NaOH. The slurry was heated to boiling temperature and kept boiling for 1 hour while periodically replacing the water which boiled off. The original filtrate was then added to the thus digested slurry and the slurry was made up to 1000 grams with distilled water. This diluted slurry was placed in an oven at a temperature of 157° C. for 47 hours. The resulting product was ground and bottled and the bottled product was heated in an oven overnight at 157° C. When a portion of this product was dissolved in water to form a 2 percent solution thereof, the pH of the resulting solution was 10. The percent of the product which did not dissolve in water was only about 20 percent.

*Example VI*

The process of Example V is repeated using lignite shale in lieu of mangrove bark.

*Example VII*

A milk of lime slurry is made up containing 322 grams per liter of calcium oxide in the form of calcium hydroxide and approximately 25 grams per liter of calcium carbonate. Four hundred pounds of ground wattle bark, 332 pounds of an aqueous solution of sodium hydroxide containing 50 percent by weight of sodium hydroxide, and 133 pounds of sodium carbonate are mixed together with sufficient of the milk of lime slurry to introduce 70 pounds of calcium oxide into the mixture. This mixture is boiled with stirring to effect a solution of the soluble components thereof at a temperature of approximately 90 to 100° C. Thereafter, the resulting mixture is fed directly to a drum drier heated directly by steam at a 100 pounds per square inch gauge pressure. Thus, the heating temperature is approximately 170° C. The product undergoing drying remains at this elevated temperature or closely thereto for several minutes. This material is then put through a hammer mill in order to grind it to a size which will pass approximately a 10-mesh screen. The resulting product is a black, granular product which contains about 10.4 percent by weight of moisture.

This product is dissolved in water and sufficient quebracho extract is added to reduce the pH of the solution to approximately 10. The resulting product is dried by evaporation in a tray or drum drier.

*Example VIII*

A milk of lime slurry is made up containing 322 grams per liter of calcium oxide in the form of calcium hydroxide. This slurry also contains approximately 25 grams per liter of calcium carbonate. Four hundred pounds of ground wattle bark, 332 pounds of an aqueous solution of sodium hydroxide containing 50 percent by weight of sodium hydroxide, and 133.2 pounds of sodium carbonate are mixed together with sufficient of the milk of lime slurry described above to introduce 70.2 pounds of calcium oxide into the mixture. This mixture is boiled with stirring to effect a solution of the soluble components thereof at a temperature of approximately 90 to 100° C. Thereupon, sufficient wattle bark extract produced by extracting wattle bark with water at 85 to 100° C. is added to reduce the pH of the slurry to approximately 7. This product is then evaporated to dryness.

While the invention has been described with particular reference to sodium hydroxide, it is also to be understood that other alkali metal hydroxides may be used in lieu of or in conjunction with sodium hydroxide. Typical alkali metal hydroxides of this type include potassium hydroxide and lithium hydroxide. However, best results are obtained when sodium hydroxide is used.

Although the present invention has been described with reference to the specific details of certain embodiments thereof, it is not intended that such details shall be regarded as limitations upon the scope of the invention except insofar as included in the accompanying claims.

This application is a continuation-in-part of my copending application Serial No. 169,782, filed June 22, 1950, now abandoned.

What is claimed:

1. A method which comprises digesting a naturally occurring material which contains water-insoluble components and at least 10 percent by weight of a member of the group consisting of tannic acid and humic acid with enough aqueous alkali metal hydroxide to increase the water dispersibility of the substance and to produce an alkaline product, and adding to such product an acidic material of the group consisting of tannic acid and humic acid, and thereby reducing the alkalinity thereof.

2. A method which comprises digesting tree bark which contains water-insoluble components and at least 10 percent by weight of tannic acid with enough aqueous alkali metal hydroxide to increase the water dispersibility thereof and to produce an alkaline product, and adding to such product an acidic material of the group consisting of tannic acid and humic acid, and thereby reducing the alkalinity thereof.

3. The process of claim 2 wherein the digestion is conducted at a temperature above 90° C. and the amount of said alkali metal hydroxide is sufficient to produce a product having a pH in excess of 10.

4. A method which comprises digesting a carboniferous material which contains water-insoluble components and at least 10 percent by weight of a member of the group consisting of tannic acid and humic acid with enough aqueous alkali metal hydroxide to increase the water dispersibility thereof and to produce an alkaline product, and adding to such product an acidic material of the group consisting of tannic acid and humic acid, and thereby reducing the alkalinity thereof.

5. The process of claim 4 wherein the carboniferous material is lignin.

6. The process of claim 4 wherein the carboniferous material is lignite shale.

7. The process of claim 4 wherein the digestion is conducted at a temperature above 90° C. and the amount of said alkali metal hydroxide is sufficient to produce a product having a pH in excess of 10.

8. The reaction product of a member of the group consisting of tannic acid and humic acid with the heat digested reaction product of a naturally occurring substance which contains at least 10 percent by weight of a member of said group and water-insoluble components with enough alkali metal hydroxide to increase the water dispersibility of the substance and to produce an alkaline product.

9. The reaction product of claim 8 wherein the naturally occurring substance is tree bark.

10. The reaction product of claim 8 wherein the naturally occurring substance is lignin.

11. The reaction product of claim 8 wherein the naturally occurring substance is lignite shale.

References Cited in the file of this patent

UNITED STATES PATENTS

| 509,703 | Taylor | Nov. 28, 1893 |
| 2,721,840 | Lee | Oct. 25, 1955 |

FOREIGN PATENTS

| 4,358 | Great Britain | of 1908 |
| 565,774 | Great Britain | Nov. 28, 1944 |